United States Patent
Kawamura (10) Patent No.: US 7,051,704 B2
(45) Date of Patent: May 30, 2006

(54) INTAKE AIR CONTROL APPARATUS AND METHOD FOR INTERNAL COMBUSTION ENGINE

(75) Inventor: Katsuhiko Kawamura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/934,391

(22) Filed: Sep. 7, 2004

(65) Prior Publication Data

US 2005/0066934 A1    Mar. 31, 2005

(30) Foreign Application Priority Data

Sep. 25, 2003  (JP)  ............................... 2003-332749

(51) Int. Cl.
*F01L 1/34* (2006.01)
*F02D 41/12* (2006.01)

(52) U.S. Cl. ............... 123/322; 123/90.15; 123/325; 123/493

(58) Field of Classification Search ............ 123/90.11, 123/90.15, 321, 322, 325, 326, 493, 90.16, 123/90.17
See application file for complete search history.

(56) References Cited

U.S. PATENT DOCUMENTS

| 6,161,521 A | * | 12/2000 | Russ et al. ................ 123/324 |
| 6,371,065 B1 | * | 4/2002 | Shiraishi et al. ......... 123/90.15 |
| 6,656,089 B1 | * | 12/2003 | Furukawa ................ 123/90.15 |

FOREIGN PATENT DOCUMENTS

| JP | 8-246938 A | 9/1996 |
| JP | 9-250373 A | 9/1997 |
| JP | 2002-89302 A | 3/2002 |
| JP | 2002-89303 A | 3/2002 |

* cited by examiner

*Primary Examiner*—Tony M. Argenbright
(74) *Attorney, Agent, or Firm*—Foley & Lardner LLP (57) ABSTRACT

An intake air control apparatus method and apparatus for an internal combustion engine in which the engine includes a variably operated valve mechanism for making at least one of an operating angle of an intake valve and a valve lift thereof variable. A determination is made on whether a deceleration fuel supply cutoff condition to cutoff the fuel supply to the engine is established. A fuel supply cutoff control is carried out when the deceleration fuel supply cutoff condition is established, and at least one of the operating angle of intake valve and the valve lift thereof is reduced by the variably operated valve mechanism to a predetermined extreme minimal value before the fuel supply cutoff control is started in a state in which the deceleration fuel supply cutoff condition is established.

18 Claims, 9 Drawing Sheets

FIG.6A ACCELERATOR

FIG.6B THROTTLE VALVE

FIG.6C OPERATING ANGLE

FIG.6D INJECTOR

FIG.7A
FIG.7B
FIG.7C
FIG.7D

INTAKE AIR CONTROL APPARATUS AND METHOD FOR INTERNAL COMBUSTION ENGINE

BACKGROUND OF THE INVENTION

1. Field of the Invention

The present invention relates to control apparatus and method for an internal combustion engine having a variably operated valve mechanism which makes at least one of an operating angle of an intake valve and a valve lift thereof and particularly relates to a technique suitable for a fuel supply cutoff during an engine deceleration.

2. Description of the Related Art

In order to reduce an harmful exhaust emission and to reduce a fuel consumption during a deceleration of the engine, a stop control of a fuel supply or, so-called, a fuel supply cutoff has been carried out during an engine deceleration in which, for example, a throttle valve is fully (completely) closed. In addition, various techniques have been proposed in which a variably operated valve mechanism which enables a valve lift characteristic of an intake valve to be varied is installed and an intake air quantity is adjusted by means of the variably operated valve mechanism and a throttle valve so that improvements of fuel consumption and engine output power are achieved. Two Japanese Patent Application First Publications Heisei 9-250373 published on Sep. 22, 1997 and 2002-089302 published on Mar. 27, 2002 exemplify previously proposed techniques such that the variably operated valve mechanism to vary both of the valve lift of the intake valve and the operating angle of the same is installed and the valve lift and operating angle of the intake valve are controlled to be minimized during the fuel supply cut-off so that a pumping loss is reduced.

SUMMARY OF THE INVENTION

It is important from a standpoint of a saving of a fuel consumption to enable to start the fuel supply cutoff as quick as possible from a time at which an engine driving mode is transferred to a deceleration state to be fuel supply cutoff, typically, from a state in which a throttle valve is completely closed. Hence, ideally, it is preferable to carry out the fuel supply cutoff at the same time when the engine driving state is transferred to the deceleration state. However, due to a volume within a collector, a delay is inevitably involved from a time at which the throttle valve is completely closed to a time at which a negative pressure within the collector is sufficiently developed. Hence, in a case where the fuel supply cutoff is immediately started from a state in which the throttle valve is completely closed, a torque is abruptly dropped to zero from a state in which the torque corresponding to the intake air quantity is left within the collector. Therefore, a, so-called, torque shock is introduced and a sense of incompatibility (an unpleasant feeling) is given to an occupant of a vehicle in which the above-described variably operated mechanism is mounted.

In order to reduce or eliminate the torque shock immediately after the fuel supply cutoff is started, a Japanese Patent Application First Publication No. Heisei 8-246938 published on Sep. 24, 1996 exemplifies a previously proposed control apparatus for an internal combustion engine in which an ignition timing is retarded in order to reduce or eliminate the torque shock immediately after the fuel supply cutoff is started. However, such a retardation of the ignition timing as described in the latter Japanese Patent Application First Publication cannot sufficiently reduce the torque. In addition, a reduction of the torque with the ignition timing retarded itself consumes fuel wastefully. An industrial field has demanded a further improvement.

It is, hence, an object of the present invention to provide improved intake air control apparatus and method for the internal combustion engine which are capable of reducing or eliminating the torque shock immediately after the fuel supply cutoff without the wasteful consumption of fuel while a start timing of the fuel supply cut-off is made earlier.

According to one aspect of the present invention, there is provided an intake air control apparatus for an internal combustion engine, comprising: a variably operated valve mechanism which makes at least one of an operating angle of an intake valve and a valve lift thereof variable; a deceleration fuel supply cutoff condition determining section that determines whether a deceleration fuel supply cutoff condition to cutoff the fuel supply to the engine is established; a fuel supply cutoff section that carries out a fuel supply cutoff control in a case where the deceleration fuel supply cutoff condition is established; and a valve lift and operating angle reducing section that reduces at least one of the operating angle of intake valve and the valve lift thereof via the variably operated mechanism to a predetermined extreme minimal value before the fuel supply cutoff control by means of the fuel supply cutoff section is started in a state in which the deceleration fuel supply cutoff condition is established.

According to another aspect of the present invention, there is provided an intake air control method for an internal combustion engine, the engine comprising variably operated valve means for making at least one of an operating angle of an intake valve and a valve lift thereof variable and the intake air control method comprising: determining whether a deceleration fuel supply cutoff condition to cutoff the fuel supply to the engine is established; carrying out a fuel supply cutoff control when the deceleration fuel supply cutoff condition is established; and reducing at least one of the operating angle of intake valve and the valve lift thereof by means of the variably operated valve mechanism to a predetermined extreme minimal value before the fuel supply cutoff control is started in a state in which the deceleration fuel supply cutoff condition is established.

This summary of the invention does not necessarily describe all necessary features so that the present invention may also be sub-combination of these described features.

DETAILED DESCRIPTION OF THE PREFERRED EMBODIMENTS

Reference will hereinafter be made to the drawings in order to facilitate a better understanding of the present invention.

Figure 1:
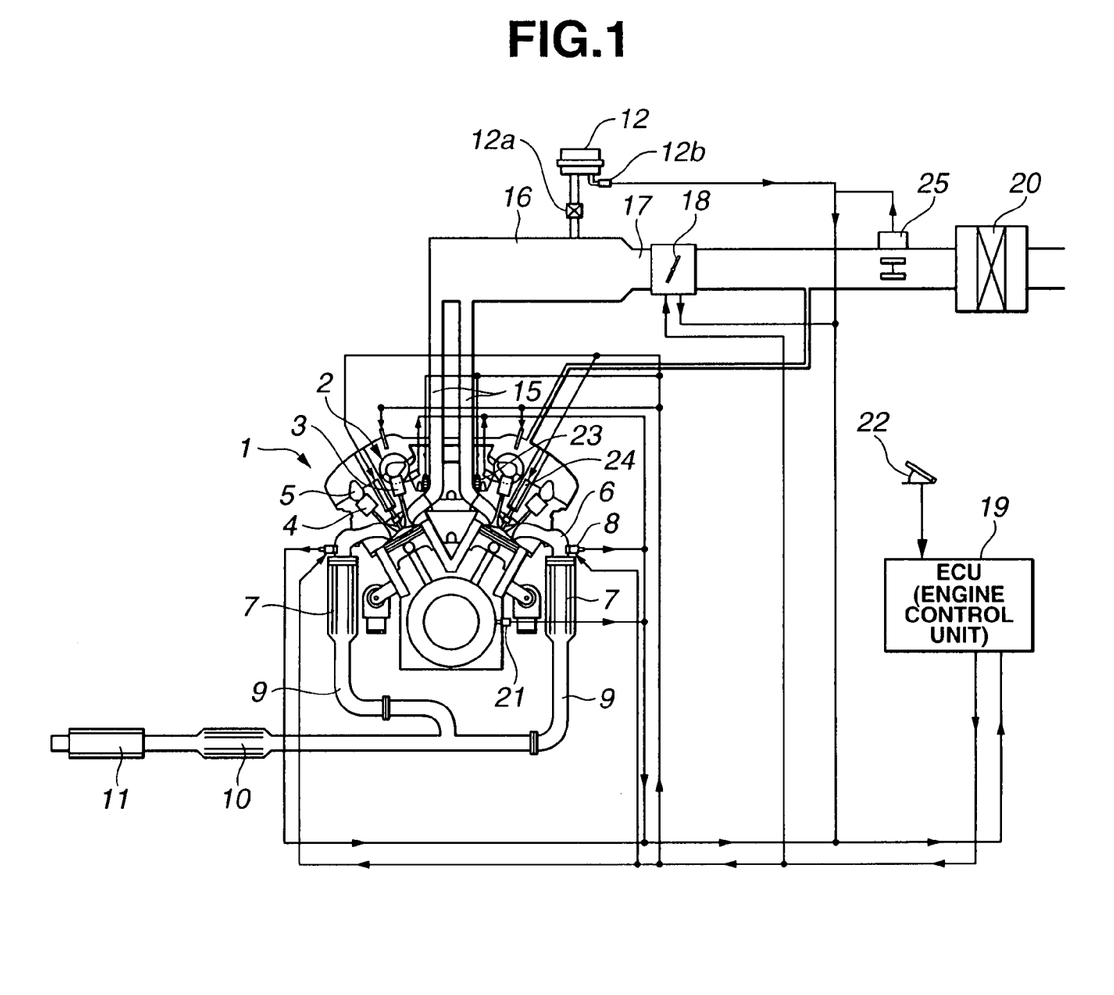
FIG. 1 is a schematic configuration view of an internal combustion engine to which an intake air control apparatus in a first preferred embodiment according to the present invention is applicable.

FIG. 1 shows a gasoline engine 1 of a V-type six cylinder to which an intake air control apparatus in a first preferred embodiment according to the present invention is applicable. Variably operated valve mechanisms 2 as will be described later are respectively mounted at an intake valve side 3 of left and right banks. Operated valve mechanisms for exhaust valve side 4 are direct drive types to drive exhaust valve 4 by means of exhaust cam shafts 5. Valve lift characteristics of the exhaust valve side operated valve mechanisms are always constant. Exhaust manifolds 6 of left and right banks are connected to catalytic converters 7. Air-fuel ratio sensors 8 are installed to detect exhaust air-fuel ratios at upstream positions of catalytic converters 7. An exhaust gas passage 9 of each of the left and right banks is joined at a downstream side of each catalytic converter 7. A second catalytic converter 10 and a muffler 11 are installed on the downstream side of catalytic converters 7. Branch passages 15 are connected to an intake port of each cylinder. Upstream ends of this six branch passages 15 are connected to a collector 16, respectively. An electronically controlled throttle valve 18 is installed on an intake air passage 17 with one end of collector 16 connected to intake air passage 17. This electronically controlled throttle valve 18 includes an actuator constituted by an electrical motor. A control signal outputted from engine control unit 19 controls its opening angle. An opening angle of electronically controlled throttle valve 18 is controlled in response to a control signal given from an engine control unit (ECU) 19. It is noted that a sensor (not shown) to detect an actual opening angle of throttle valve 18 is integrally installed onto throttle valve 18. On the basis of a detection signal of the opening angle, the opening angle of throttle valve 18 is, in a close loop, controlled to a target opening angle. In addition, an airflow meter 25 is disposed to detect the intake air quantity at an upstream side of throttle valve 18 and an air cleaner 20 is installed furthermore at an upstream side of throttle valve 18.

A negative pressure equipment utilizing the negative pressure within collector 16, for example, a brake booster (brake power assist) 12 which assists a depression force of the driver utilizing the negative pressure is connected to collector 16. This brake booster 12 is connected to collector 16 via a check valve 12a and is equipped with a brake negative pressure sensor 12b to detect a brake negative pressure. As the other negative pressure equipment, a canister or EGR (Engine Exhaust Gas Recirculation) unit is appropriately installed within the engine.

To detect an engine revolution speed and a crank angle position, a crank angle sensor 21 is disposed on a crankshaft. An accelerator opening angle sensor 22 is installed to detect an accelerator pedal opening angle (depression quantity) operated by the driver. These detection signals are inputted to engine control unit 19 together with detection signals of an airflow meter 25, air-fuel ratio sensor 8, and brake negative pressure sensor 12b. Engine control unit 19 controls, on the basis of these detection signals, an injection quantity and an injection timing of a fuel injection valve (or so-called, injector) 23, an ignition timing by means of a spark plug 24, a valve lift characteristic by means of each of variably operated valve mechanisms 2, and an opening angle of throttle valve 18.

Next, a structure of a typical one variably operated valve mechanism 2 for intake valve 3 will be described with reference to FIG. 2. This variably operated valve mechanism 2 includes; a (valve) lift and operating angle variable mechanism 51 which varies a valve lift of intake valve 3 and an operating angle of same intake valve 3; a phase variable mechanism 71 which retards or advances a phase of a center angle of the lift (a phase with respect to a crankshaft (not shown)).

At first, lift and operating angle variable mechanism 51 will be described below. Lift and operating angle variable mechanism 1 has been exemplified by a Japanese Patent Application First Publication No. 2002-89303 (published on Mar. 27, 2002). Thus, a general description of lift and operating angle variable mechanism 51 will be made hereinbelow. Lift and operating angle variable mechanism 51 includes: intake air valve 3 disposed slidably (lifted and lowered) on a cylinder head; a drive axle 52 rotatably supported by means of a cam bracket (not shown) placed at an upper portion of the cylinder head; an eccentric cam 53 fixed to drive axle 52 by means of, for example, a press fit; a control axle 62 supported rotatably by means of the same cam bracket at an upper position of drive axle 52 and disposed in parallel (juxtaposed) to drive axle 52; a rocker arm 56 supported so as to enable to be swung on eccentric cam portion 68 of control axle 62; and a swing cam (or, simply, cam) 59 contacted with a tappet 60 arranged on an upper end portion of each intake air valve 3. A link arm 54 interlinks between eccentric cam 53 and rocker arm 56. Rocker arm 56 and (swing) cam 59 are interlinked with a link member 58. Drive axle 52 is driven by means of the engine crankshaft of the engine via a timing chain or a timing belt as will be described later. Eccentric cam 53 has a circular outer peripheral surface, a center of the outer peripheral surface is offset by a predetermined quantity from an axial center of drive axle 52. A ring-shaped portion of link arm 54 is rotatably fitted into the outer peripheral surface of eccentric cam 53. A substantial center portion of rocker arm 56 is supported by means of eccentric cam 68. An arm portion of link arm 54 is interlinked via a linkage pin 55 and an upper end portion of link member 58 is interlinked via a linkage pin 57. Eccentric cam portion 68 is eccentric from an axial center of control axle 62. Hence, a center of rocker arm 56 on which rocker arm 56 is swung is varied in accordance with an angular position of control axle 62.

Cam 59 is rotatably supported on and fitted to an outer periphery of drive axle 52. A lower end portion of link member 58 is interlinked via a linkage pin 67 to an end of cam 59 extended toward a side direction. A basic circular surface formed of a concentric arc with drive axle 52 and a cam surface extended from the basic circular surface with a predetermined curve drawn are continuously formed on a lower surface of cam 59. These basic circular surface and cam surface are contacted on an upper surface of tappet 60 in accordance with a swung position of cam 59. That is to say, the basic circular surface is an interval during which the lift (quantity) is zero as a base circle interval. When cam 59 is swung so that the cam surface-thereof is contacted with tappet 60, cam 59 is gradually lifted. It is noted that a slight ramp interval is installed between the base circle interval and the lift interval. Control axle 62 is constructed, as shown in FIG. 2, so as to be revolved within a predetermined angular range by means of a lift and operating angular control purpose actuator 63 installed on one end portion of control axle 62.

This lift and operating angular control purpose actuator 63 is an electric drive type of a servo motor to drive control axle 62, for example, via a worm gear 65. Control signal from engine control unit (ECU) 19 serves to control this actuator 63. A revolution angle of control axle 62 is detected by means of a control axis sensor 64.

An action of lift and operating angle variable mechanism 51 will be explained below. When drive axle 52 is revolved, a cam action of eccentric cam 53 moves link arm 54 in upward and downward directions (as viewed from FIG. 3) and accordingly rocker arm 56 is swung. The swing action of this rocker arm 56 is transmitted to cam 56 via link member 58 so as to swing cam 59. A cam action of cam 59 presses tappet 60 so that intake valve 3 is lifted.

If an angle of control axle 62 with respect to the axis thereof is changed via a lift operating angle control purpose actuator 63, an initial position of rocker arm 56 is varied and an initial oscillation (swing) position of cam 59 is varied. For example, when eccentric cam portion 68 is positioned at an upper direction as viewed from FIG. 2, rocker arm 56 is moved in an upward direction as a whole. Then, an end of linkage pin 67 of cam 59 is relatively pulled up in an upward direction. In details, the initial position of cam 59 is tilted in a direction separated from tappet 60. Hence, when cam 59 is oscillated (swung) along with a revolution of drive axle 52, the basic circular surface is continued to be contacted with tappet 60 for a relatively long time but a time interval during which the cam surface is contacted with tappet 60 is short. Hence, the lift (length) becomes small (short) as a whole and, in addition, an angular range from its open interval to the closed interval, namely, the operating angle become narrowed. On the contrary, when eccentric cam 68 is positioned at a lower position, rocker arm 56 is positioned wholly at a lower position. The end portion of linkage pin 67 of eccentric cam 59 is relatively pulled down. In other words, the initial position of cam 59 is tilted in a direction toward which the cam surface approaches to tappet 60. Hence, when swing arm 59 is oscillated (swung) along with the revolution of drive axle 52, a position at which cam 59 is contacted with tappet 60 is immediately transferred from the basic circular surface to the cam surface. Hence, the lift (length) becomes wholly large and its operating angle becomes expanded (or widened). The initial position of eccentric cam portion 68 can continuously be varied. Accordingly, the valve lift characteristic is continuously varied. In details, both of the lift and operating angle can simultaneously be expanded (widened) or shrunk (narrowed). Although depending upon a layout of each part, open and closure timings of intake valve 3 are, for example, substantially symmetrically varied along with the variation in magnitude of the valve lift and operating angle described above.

Figure 2:
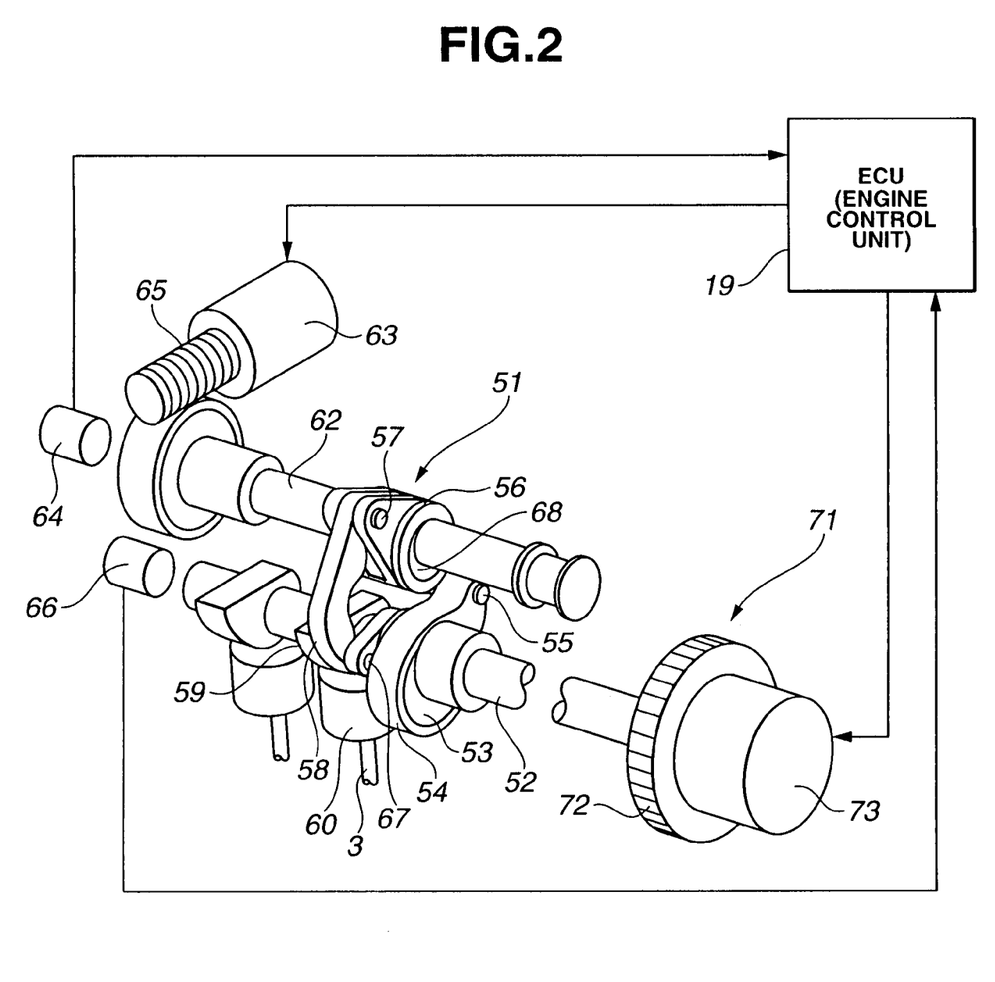
FIG. 2 is a perspective view representing a configuration of a variably operated valve mechanism applicable to the intake air control apparatus in the first preferred embodiment.

Next, phase variable mechanism 71, as shown in FIG. 2, includes: a sprocket 72 installed at a front end position of drive axle 52, and a phase control purpose actuator 73 which relatively revolves sprocket 72 and drive axle 52 within a predetermined angular range. Sprocket 72 is interlinked with the crankshaft via a timing chain or a timing belt (not shown). Phase control purpose actuator 73 is constituted by a hydraulic or electromagnetic rotary actuator and is controlled in accordance with a control signal from engine control unit 19. An action of phase control purpose actuator 73 causes a relative revolution between sprocket 72 and drive axle 52. Thus, a lift center angle in the valve lift is advanced or retarded. In other words, the whole valve lift is advanced or retarded without change in a curved line itself of the lift characteristic. In addition, this variation can continuously be obtained. A control state of phase variable mechanism 71 is detected by means of a drive axle sensor 66 which responds to the revolution position of drive axle 52. In each of embodiments according to the present invention, lift operating angle variable mechanism 51 and phase variable mechanism 71 are close loop controlled on the basis of the detection of each sensor 64 and 66.

FIGS. 9A through 9D integrally show a timing chart of a comparative example in which the variably operated valve mechanisms described above and which vary the valve lift characteristics are not installed and an engine intake air quantity is adjusted substantially only by means of throttle valve. As shown in FIGS. 9A through 9D, during the engine deceleration in which an accelerator opening angle is reduced, a negative pressure within the collector is not instantaneously developed even if the throttle valve is closed and the negative pressure is moderately increased in accordance with a collector volume or so on. In other words, a predetermined response delay is unavoidably involved in a development of the negative pressure. Hence, from a time A1 at which the throttle valve is completely closed to a time A2 at which the fuel supply cutoff can be started without the torque shock, with the negative pressure within collector sufficiently developed and the intake air quantity left within the collector sufficiently reduced, and with a negative pressure development interval $\Delta A$ of, for example, approximately 300 ms (milliseconds) is needed. In this way, time interval $\Delta A$ from time A1 at which the fuel supply cutoff should be started to time A2 at which the actual fuel supply cutoff can be started is relatively long. During this time interval, the fuel is needed to continue to be supplied by a small quantity. A wasteful fuel is consumed. The embodiment described below is to make the start time interval of the fuel supply cutoff earlier, to improve a control responsive characteristic, and to improve the fuel consumption without the torque shock. It is noted that the same reference signs are attached to the common parts to each of the embodiments and double explanation thereof will be omitted here.

Figure 3:
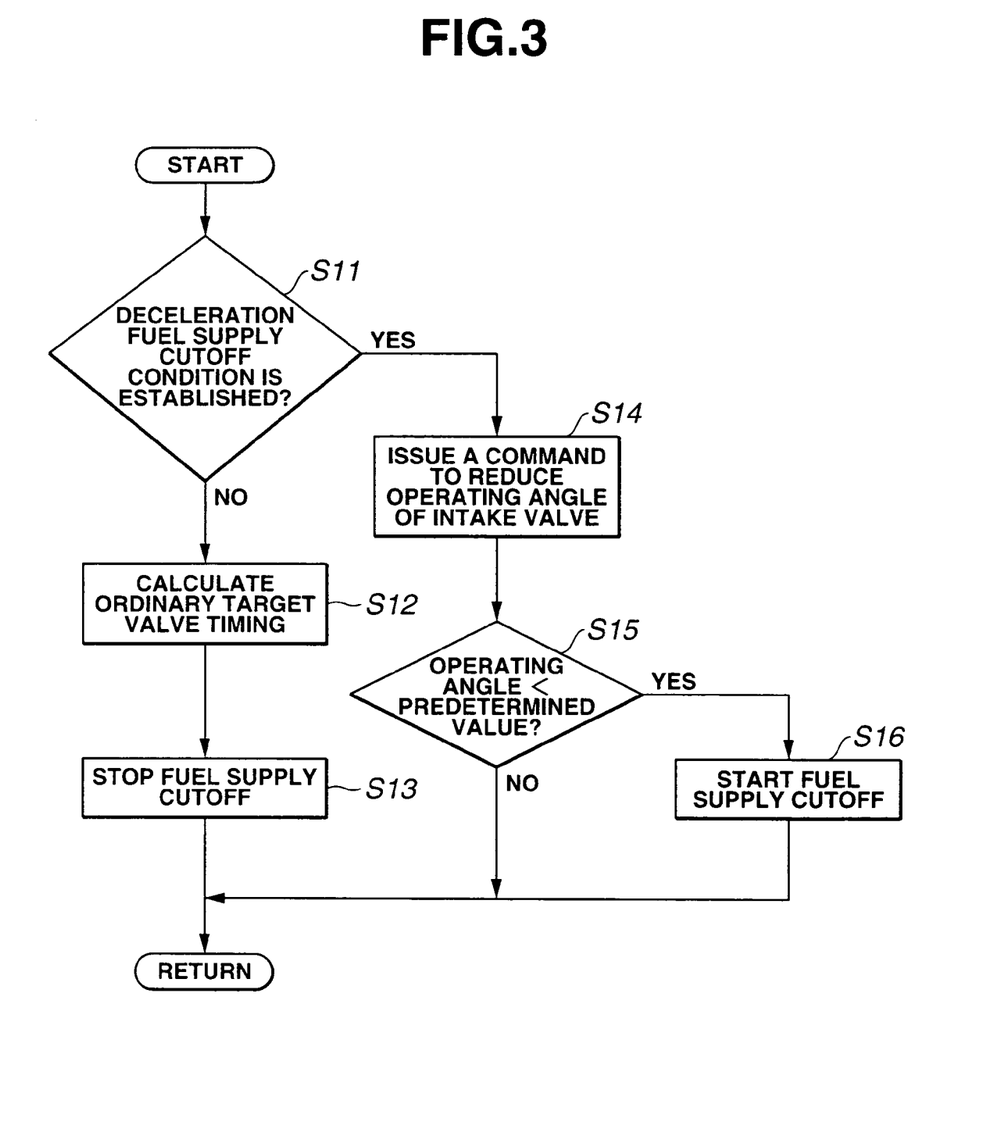
FIG. 3 is an operational flowchart representing a control flow of the intake air control apparatus in the first preferred embodiment shown in FIG. 1.

At first, a first preferred embodiment of an intake air control apparatus according to the present invention will be described below with reference to FIGS. 3 and 4. FIG. 3 is an operational flowchart representing a flow of control executed by engine control unit (ECU) 19 for each of predetermined interval of time (for example, for each 10 millisecond or for a predetermined crank angle (CA)). At a step S11, engine control unit 19 determines whether a (predetermined) deceleration fuel supply cutoff condition (the engine driving state falls in a state in which the fuel supply is to be cutoff) is established. This deceleration fuel cutoff condition corresponds to a situation in which an engine demand load is minus and, more specifically, an accelerator pedal is not depressed (an engine idling switch is turned on) or in which throttle valve 18 is completely closed.

If engine control unit 19 determines that deceleration fuel supply cutoff condition is not established (No) at step S11, the engine goes to a step S12. Engine control unit 19 performs the ordinary intake valve lift characteristic control described above. In details, engine control unit 19 calculates target values for lift and operating angle variable mechanism 51 and phase variable mechanism 71 and outputs command signals corresponding to these target values to their actuators 63 and 73. In addition, if the fuel supply cutoff is being executed, engine control unit 19 stops the fuel supply cutoff and calculates and sets a fuel injection quantity and fuel injection timing at a step S13. It is noted that T1 shown in FIG. 4C corresponds to a timing at which deceleration fuel supply cutoff is established from a situation in which deceleration fuel supply cutoff condition is not established, namely, corresponds to a timing at which a fuel supply cutoff request (demand) is started.

Figure 4A:
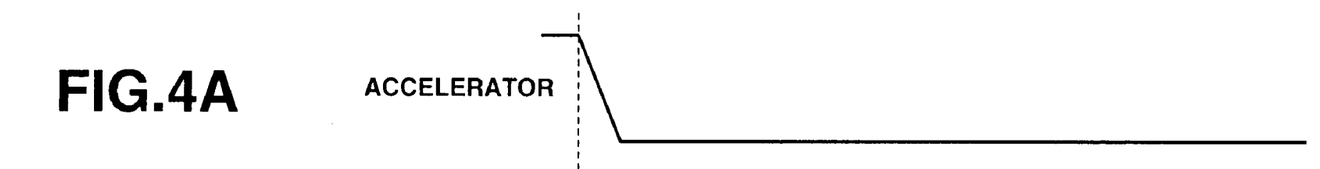
FIGS. 4A, 4B, 4C, and 4D are integrally a timing chart representing variations of an accelerator, a throttle valve, an operating angle, and an injector in the intake air operational angle of the intake air control apparatus in the first embodiment shown in FIG. 1.
Figure 4B:
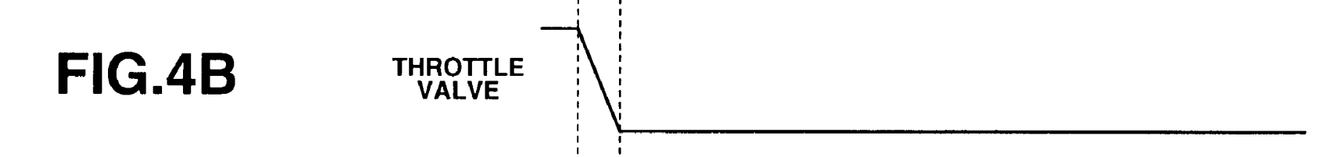
Figure 4C:
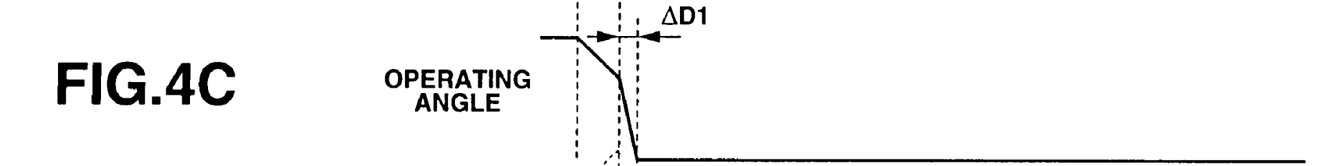
Figure 4D:
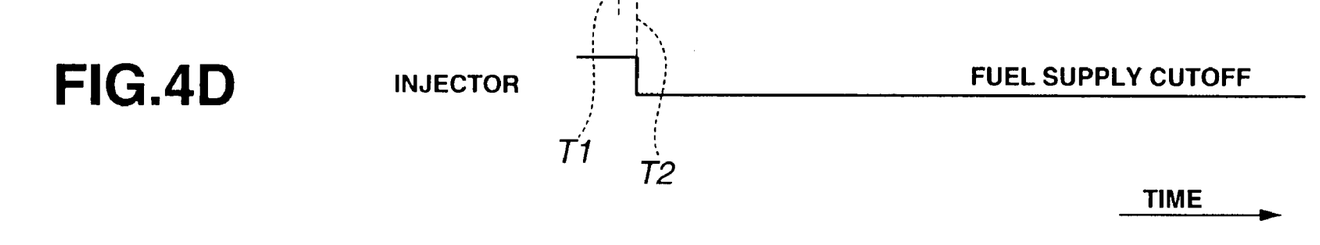

If deceleration fuel supply cutoff condition is established (Yes) at step S11, the routine goes to a step S14. At step S14, engine control unit 19 outputs a command signal corresponding to an extreme minimal value (or simply minimal value) in such a manner that the operating angle of intake valve 3 (and/or the valve lift (quantity) thereof (namely, at least one of the operating angle and the valve lift (quantity)) is reduced toward a predetermined extreme minimal value. In FIG. 3, a predetermined value corresponds to the minimal value. That is to say, under the establishment of the deceleration fuel supply cutoff condition and before the fuel supply cutoff is actually started, the operating angle of intake valve 3 is reduced to the predetermined extreme minimal value (valve lift and operating angle reducing section (means)). However, since lift and operating angle variable mechanism 51 is of electric motor drive type and has a fast responsive characteristic, the lift and operating angle are speedily reduced toward the extreme minimal value as shown in FIGS. 4A through 4C.

At the next step S15, engine control unit 19 determines whether the operating angle of intake valve 3 has reached to the predetermined value corresponding to the extreme minimal value, in other words, the operating angle is reduced to a vicinity to the extreme minimal value on the basis of a detection signal of control axis sensor 64. It is noted that T2 shown in FIG. 4C corresponds to a time at which the operating angle has reached to the extreme minimal value. When the operating angle has reached to the extreme minimal value, the routine goes from step S15 to a step S16. At step S16, engine control unit 19 starts the fuel supply cutoff. In other words, when the operating angle has reached to the extreme minimal value after the establishment of the deceleration fuel supply cutoff condition, the fuel supply cutoff control is started. In the first embodiment, at the same time when the operating angle becomes the extreme minimal value, the fuel supply cutoff is started in order to make the start timing of the fuel supply cutoff as early as possible.

As described above, in the first embodiment, in a case where the deceleration fuel supply cutoff condition to start the fuel supply cutoff is established, the operating angle of intake valve 3 is reduced to the extreme minimal value and, at the same time when the operating angle described above has reached to the extreme minimal value, the fuel supply cutoff is started. In the situation in which the operating angle (lift) of intake valve 3 is reduced to the extreme minimal value (T1 to T2 shown in FIG. 4C), the intake air quantity sucked into the combustion chamber of the engine is speedily reduced, irrespective of the intake air quantity left within the collector. When the (lift) operating angle of has reached to the extreme minimal value, the intake air quantity sucked into the combustion chamber becomes extremely reduced. Hence, if the fuel supply cutoff is started, a vehicular occupant does not give the unpleasant feeling since the torque abrupt dropping, so-called, torque shock does not occur if the fuel supply cutoff is started. In this way, since the intake air quantity sucked into the combustion chamber can speedily be reduced without dependence of the intake air quantity left within the collector. Hence, timing (a time) T2 at which the fuel supply cutoff can be started can remarkably make earlier without introduction of the torque shock. Accordingly, an interval ΔD1 (refer to FIG. 4C) for which the fuel is wastefully consumed can sufficiently be shortened. For example, interval of ΔD1 can sufficiently be shortened to several milliseconds (for example, multiples of ten milliseconds). Therefore, together with the remarkable reduction of the fuel consumption, a responsive characteristic of control is improved and an engine driveability is improved. Especially, in the first embodiment, since the fuel supply cutoff is started at the same time when the operating angle has reached to the extreme minimal value, the above-described interval of ΔD1 can become shortest.

Figure 5:
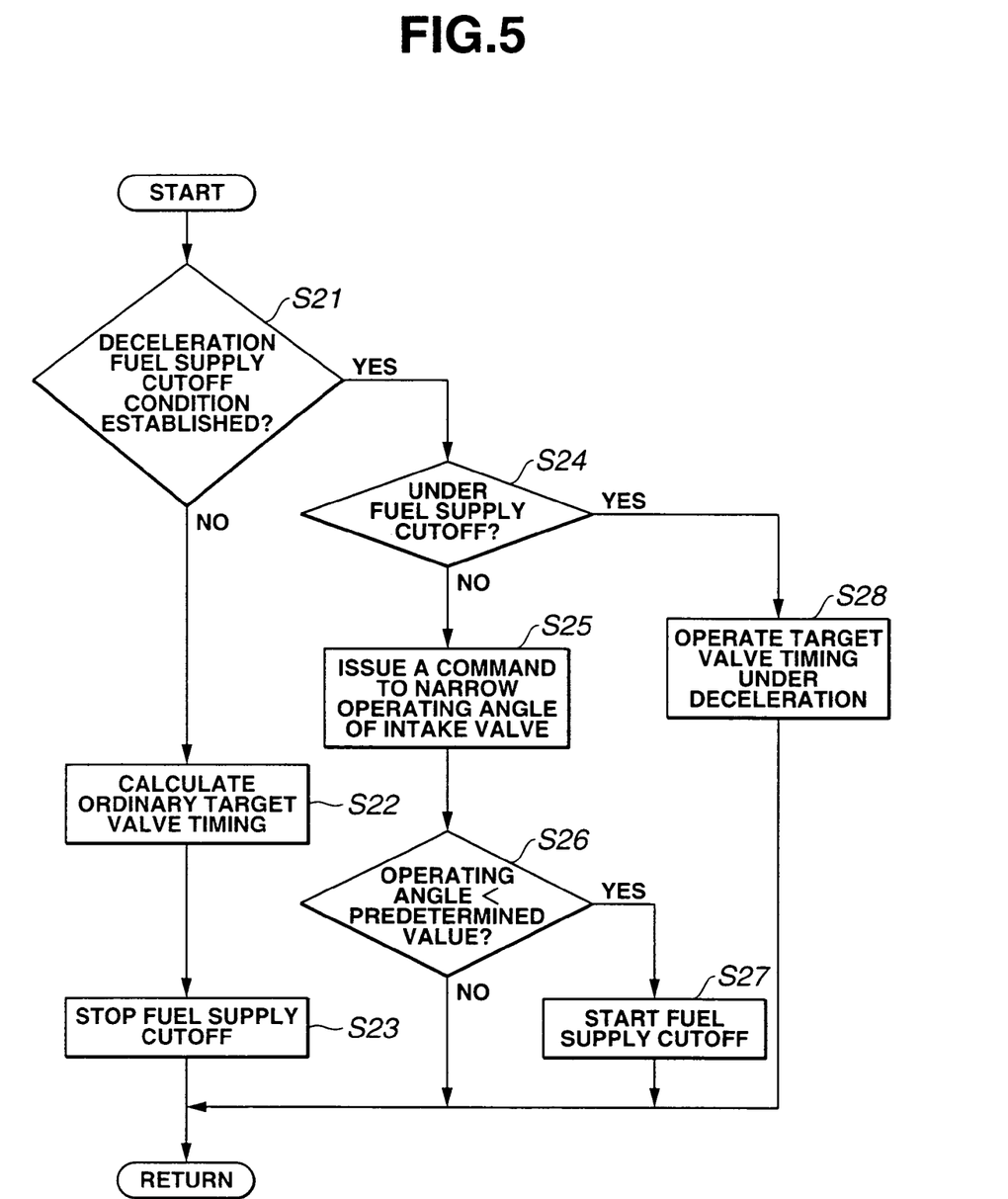
FIG. 5 is an operational flowchart representing a control flow of the intake air control apparatus in a second preferred embodiment according to the present invention.
Figure 6A:
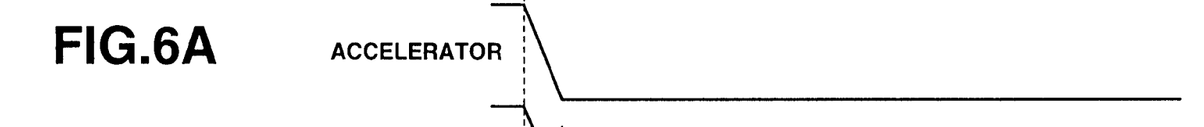
FIGS. 6A, 6B, 6C, and 6D are integrally a timing chart representing variations of the accelerator, the throttle valve, the operating angle, valve open intervals, and the injector in the intake air control apparatus in the case of the second embodiment.
Figure 6B:
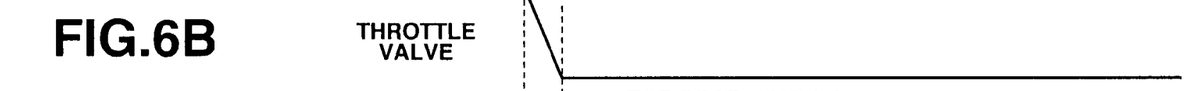
Figures 6C, 6D:
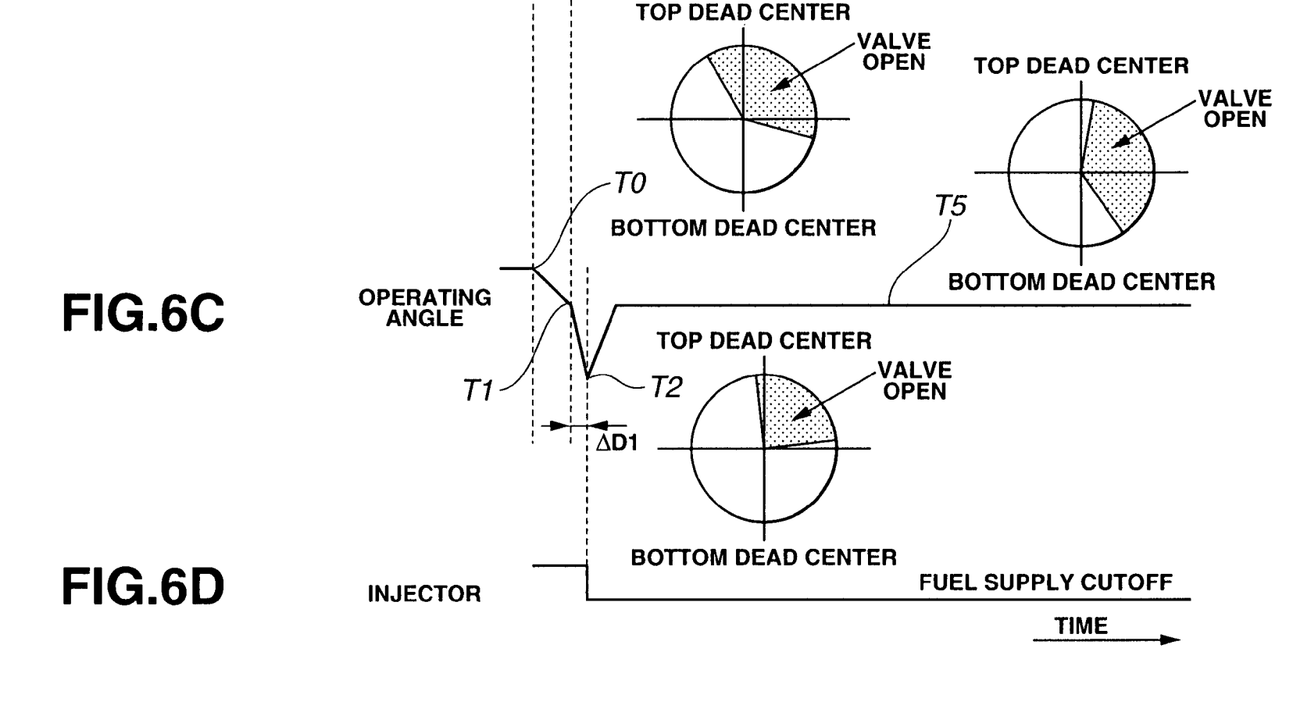
Figure 7A:
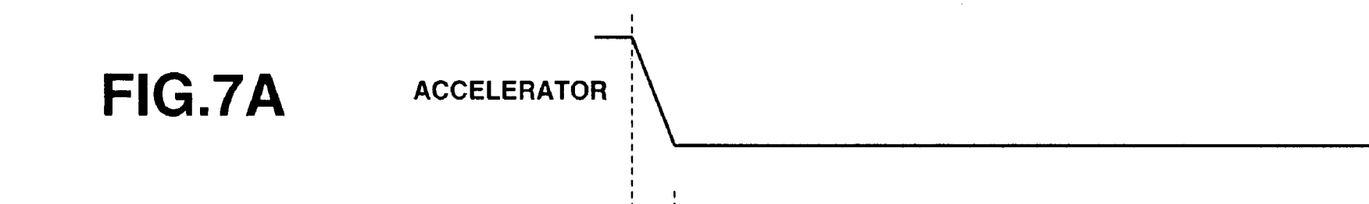
FIGS. 7A, 7B, 7C, and 7D are integrally a timing chart representing variations of the accelerator, the throttle valve, the operating angle, and the injector of the intake air control apparatus in a third preferred embodiment according to the present invention.
Figure 7B:
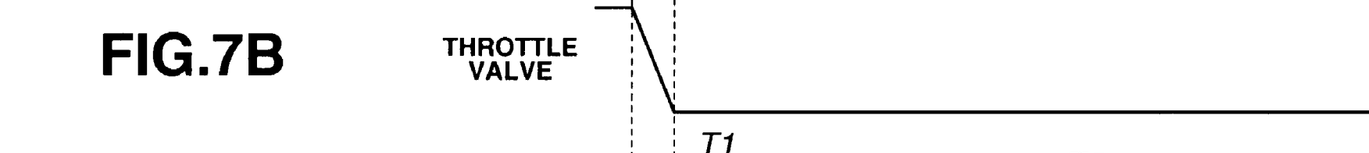
Figure 7C:
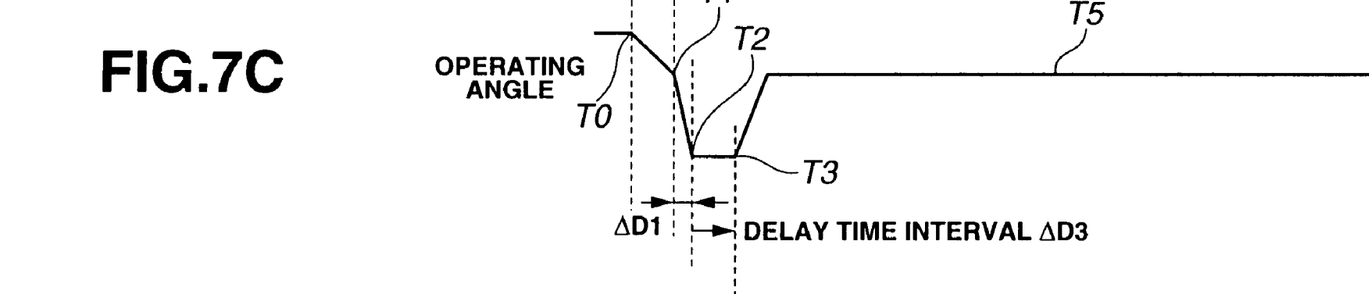
Figure 7D:
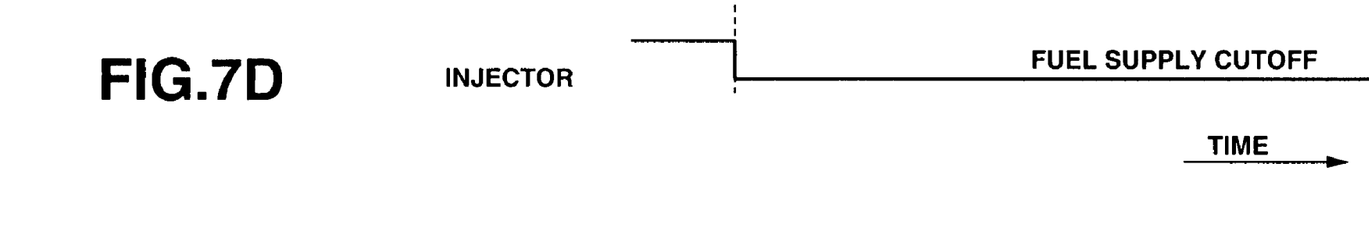

FIG. 5 and FIGS. 6A through 6D show the operational flowchart and integrally a timing chart representing a flow of control related to a second preferred embodiment according to the present invention, respectively. The contents of processes at steps S21, S22, and S23 are the same as steps S11 through S13. If the deceleration fuel supply cutoff condition is established at step S21 (Yes), the routine goes to a step S24. At step S24, engine control unit 19 determines whether the fuel supply is being cutoff (under the fuel supply cutoff). This determination may be carried out on the basis of a status of a flag set in accordance with the start or stop of the fuel supply cutoff at step S23 or a step S27. In the situation immediately after the establishment of the fuel supply cutoff condition, the determination at step S24 is negated and the routine goes to a step S25. In the same way as step S14 in the first embodiment, engine control unit 19 outputs the command signal to lift and operating angle variable mechanism 51 to reduce the lift and operating angle by means of lift and operating variable mechanism 51 toward the predetermined extreme minimal value. That is to say, in a state in which the deceleration fuel supply cutoff condition is established and before the fuel supply cutoff is actually started, lift and operating angle variable mechanism 51 reduces the lift and the operating angle to the predetermined extreme minimal value (operating angle reducing section (means)). Lift and operating angle variable mechanism 51 is of the electric motor driven type and has a good responsive characteristic. Hence, as shown in FIG. 6C, the lift and the operating angle are speedily reduced toward the extreme minimal value.

At the next step S26, engine control unit 19 determines whether the operating angle of intake valve 3 has reached to the predetermined value corresponding to the extreme minimal value on the basis of the detection signal of control axis sensor 64 in the same way as step S15. T2 shown in FIG. 6C corresponds to a time at which the operating angle has reached to the extreme minimal value. When the operating angle has reached to the extreme minimal value, the routine goes from step S26 to a step S27. At step S27, the fuel supply cutoff is started.

When the fuel supply cutoff is started, the determination at step S24 is positively determined and the routine goes to a step S28. The valve lift characteristic such as a valve timing and a valve lift quantity of the intake valve is operated so as to return to the target value of the deceleration idling driving range. Specifically, as shown in FIG. 6C, both or either the operating angle or valve lift (or valve lift variable) is increased to a predetermined idle reference value higher than the extreme minimal value. In addition, the phase of an intake center angle is modified and controlled toward a retardation angle side from the setting of the extreme minimal value by means of phase variable mechanism 71. In details, when the operating angle has reached to the extreme minimal value and, at the same time, when the fuel supply cutoff is started, the operating angle of intake valve 3 is increased to an idle reference value (lift operating valve increasing section (means)).

In more details, as shown in FIGS. 6A through 6D, the idle reference value which is a target value of the operating angle of intake valve 3 at an idling range of T5 shown in FIG. 6C corresponds to minimum valve lift and minimum operating angle required to secure a negative pressure for a negative pressure (operating) equipment and corresponds to minimum valve lift and minimum operating angle required to secure a combustion stability. Typically, the idle reference value is set in a range from about 120° to 140° CA, as appreciated from a valve open area in a right uppermost circle of FIG. 6C. For example, at a time point of T0 at which the driving region falls in a low-speed-and-low-load region, the operating angle is largely set with respect to the valve lift characteristic at the idling region (at time of T5) and a center phase is set to an advance angle side. Therefore, an intake valve open timing (IVO) is slightly advanced than a top dead center, intake valve closure timing (IVC) is remarkably advanced than a bottom dead center, and the operating angle is set to give approximately 140° through 160° CA, as appreciated from the valve open area of a left uppermost circle of FIG. 6C.

Extreme minimal value (at time of T2) of the operating angle described above is furthermore smaller than idle reference value and, in other words, the extreme minimal value (at time of T2) is furthermore smaller than the idling reference value (at T5). Furthermore, the extreme minimal value is further lower than the minimum valve lift and minimum operating angle required to secure a combustion stability and lower than the minimum lift and the minimum operating angle required to secure the negative pressure within the collector. Specifically, the extreme minimal value is set to 80° to 120° CA as appreciated from the valve open area of a circle at a lowest position of FIG. 6C. In addition, the center phase at this time is set toward more advanced angle side as compared with the setting of T5 at the idling range.

As described above, in the second embodiment, when the deceleration fuel cutoff condition is established, at least one of the (valve) lift and operating angle of intake valve 3 is once reduced toward the extreme minimal value which is furthermore lower than the minimum idling reference value required to secure the combustion stability and collector negative pressure. When the lift and operating angle of intake valve 3 have reached to the extreme minimal value, the lift and operating angle of intake valve 3 is again increased toward the idle reference value. Hence, in the same way as the first embodiment, the time at which the fuel supply cutoff can be started can be made earlier without introduction of the torque shock. In addition, the fuel consumption can be saved and the following advantages can be exhibited. Under a condition at which the lift and operating angle are left at extreme minimal value, the intake air quantity to be sucked into fuel combustion chamber is extremely reduced. Hence, even if throttle valve 18 is completely closed, the negative pressure with collector 16 can sufficiently be reduced. For example, the negative pressure demanded for, for example, brake servo unit 12 cannot be developed. During the deceleration, a desired brake assistance force may not be obtained. In the embodiment, since the operating angle of intake valve 3 is increased to the idle reference value at the instant time when the operating angle is reached to extreme minimal value, the negative pressure within the collector can sufficiently be secured. During this deceleration fuel supply cutoff, a desired brake assistance force can positively be assured. In addition, since the lift and operating angle are previously returned to the idle reference value, an increase width of the (valve) lift and operating angle can be reduced when the fuel injection is recovered after the fuel supply cutoff is carried out so that a speedy resumption of the fuel injection can be achieved. Especially, after the deceleration drive along with the fuel supply cutoff is carried out, the engine driving condition is often transferred to the idling drive. Hence, with the operating angle previously returned to an idle reference value, the transfer of the engine driving condition to the idling drive can speedily be carried out.

A third preferred embodiment of the intake air control apparatus whose timing chart is integrally shown in FIGS. 7A through 7D is basically the same as the second embodiment. Furthermore, a predetermined fuel supply cutoff purpose delay time interval ΔD3 is provided from a time T2 at which the operating angle has reached to the extreme minimal value to a time T3 at which the fuel supply cutoff is started. In other words, the fuel supply cutoff is started waiting for a passage of the predetermined delay interval of time ΔD3 from a time at which the opening angle is reduced to the extreme minimal value to a time at which an unintentional flow in the fuel adhered onto intake valve or intake port of the engine is eliminated. Hence, such a situation that the adhered fuel is unintentionally streamed into a cylinder to give the torque shock immediately after the start of the fuel supply cutoff can positively be prevented. A driving stability immediately after the start of the fuel supply cutoff can furthermore be improved. The above-described predetermined delay time interval ΔD3 is set to a sufficiently short interval of time (for example, several milliseconds) as compared with an interval of time ΔA (refer to FIG. 9D) during which the negative pressure within the collector is developed. Hence, the start timing of the fuel supply cutoff can become earlier and the effect of securing the collector negative pressure cannot be damaged.

Figure 8A:
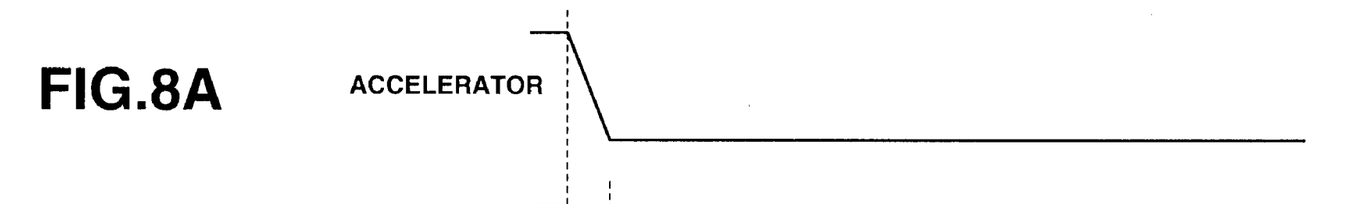
FIGS. 8A, 8B, 8C, and 8D are integrally a timing chart representing variations of the accelerator, the throttle valve, the opening angle, and the injector of the intake air control apparatus in a fourth preferred embodiment according to the present invention.
Figure 8B:
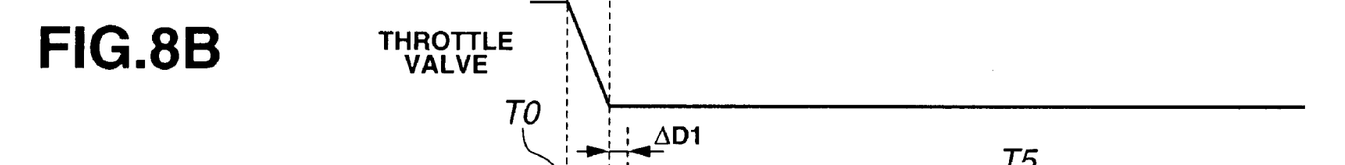
Figure 8C:
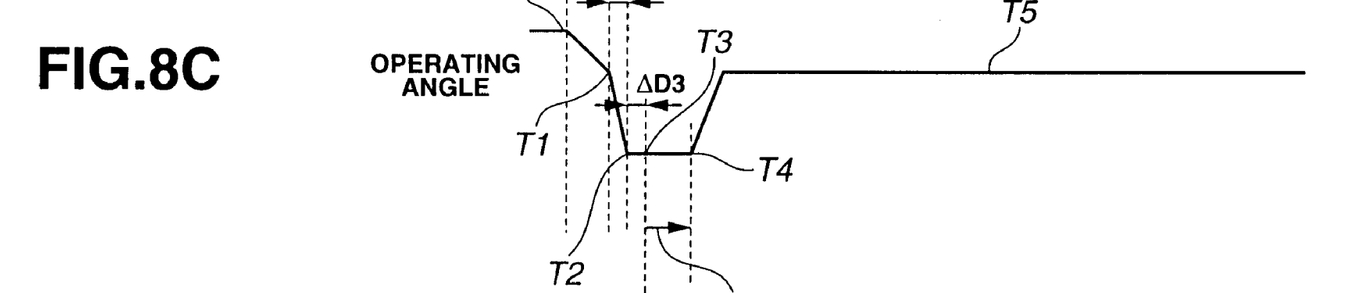
Figure 8D:
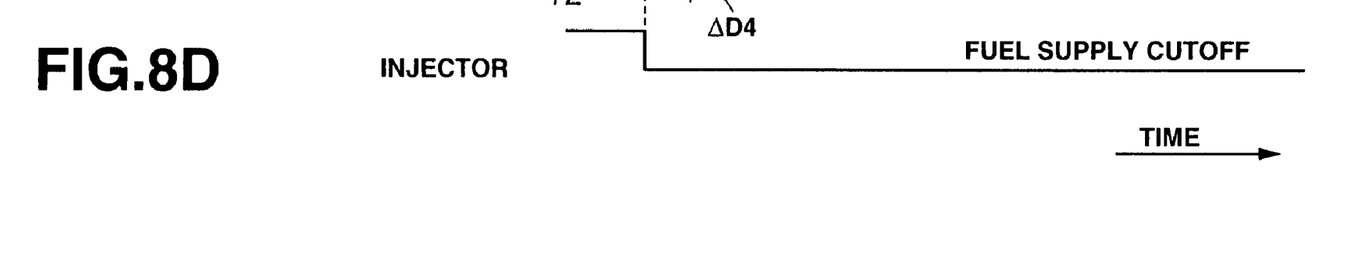
Figure 9A:
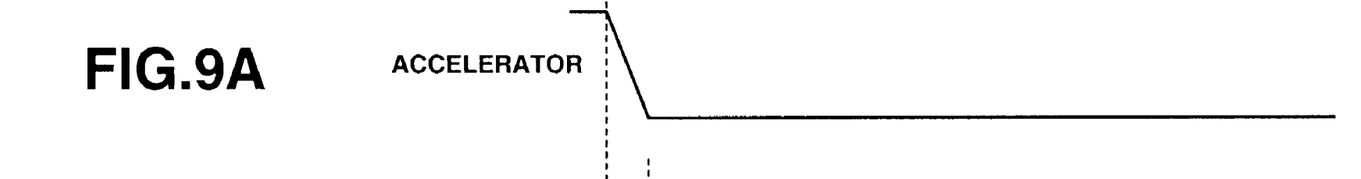
FIGS. 9A, 9B, 9C, and 9D integrally a timing chart for explaining a comparative example to the intake air control apparatus according to the present invention.
Figure 9B:
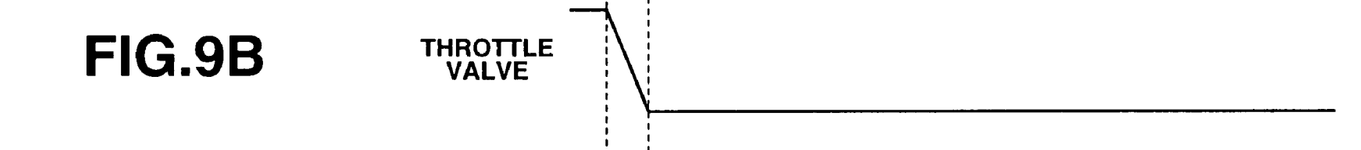
Figure 9C:
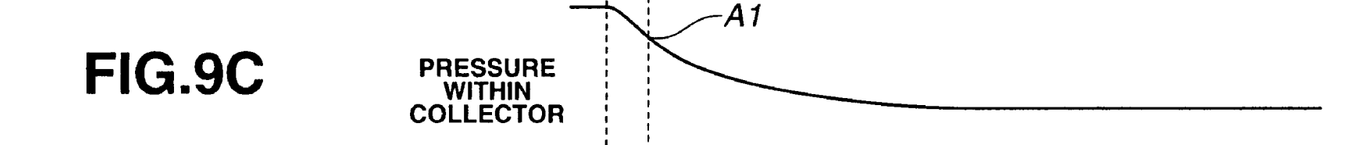
Figure 9D:
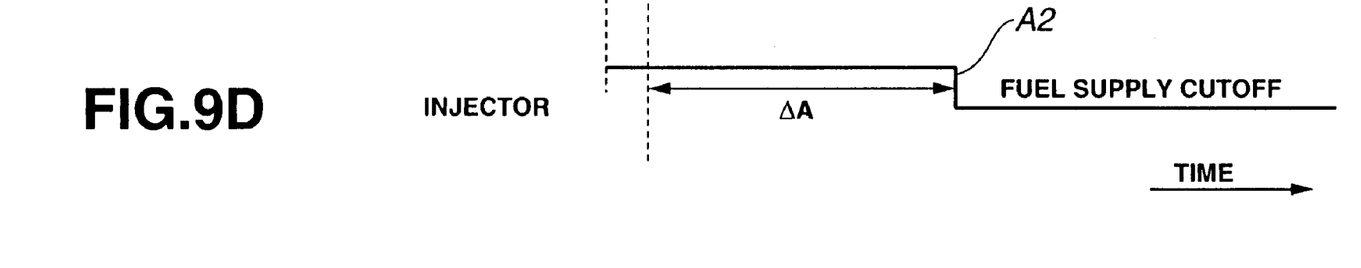

In a fourth preferred embodiment, a predetermined opening angle increasing delay interval ΔD4 is provided from time t3 at which the fuel supply cutoff is started to a time T4 at which the increase control is started to the idle reference value of valve lift and operating angle of intake valve, although the fourth embodiment is generally the same as the third embodiment. In the fourth embodiment, the same advantage as the third embodiment can be achieved. In addition, an irregular combustion due to a residual fuel after the fuel supply cutoff can furthermore be prevented. The driving stability immediately after the start of fuel supply cutoff can furthermore be improved. The delay interval of time ΔD4 is set to be a sufficiently short interval of time (for example, several milliseconds) as compared with the negative pressure development interval ΔA (refer to FIG. 8D) within the collector. Hence, the start timing of the fuel supply cutoff can be made earlier and the collector negative pressure can be secured.

As described hereinabove, the present invention has been described on the basis of the specific preferred embodiments. However, the present invention is not limited to these embodiments. Various changes and modification can be made without departing from the sprit and scope of the present invention. For example, in each embodiment described above, both of the valve lift (quantity) and operating angle of intake valve 3 are variable by means of lift and operating angle variable mechanism 51. However, another variably operated valve mechanism which is variable only for one of the operating angle and valve lift (quantity) may be used. In this alternative case, before the start of the fuel supply cutoff, one of the operating angle and valve lift (quantity) may be reduced toward the extreme minimal value. It is noted that the predetermined value described at step S15 of FIG. 3 is the predetermined extreme minimal value corresponding to the minimum idling reference value required to secure the combustion stability and collector negative pressure and the predetermined value at step S26 of FIG. 5 is also the predetermined extreme minimal value corresponding to the operating angle by which only the extremely small intake air quantity exceeding a combustible limit is obtained, and, in other words, the operating angle which is further lower than the minimum reference value and is set at 80° through 120° CA (Crank Angle) described in the second embodiment.

The entire contents of a Japanese Patent Application No. 2003-332749 (filed in Japan on Sep. 25, 2003) are herein incorporated by reference. The scope of the invention is defined with reference to the following claims.

What is claimed is:

1. An intake air control apparatus for an internal combustion engine, comprising:
    a variably operated valve mechanism which makes at least one of an operating angle of an intake valve and a valve lift thereof variable;
    a deceleration fuel supply cutoff condition determining section that determines whether a deceleration fuel supply cutoff condition to cutoff the fuel supply to the engine is established;
    a fuel supply cutoff section that carries out a fuel supply cutoff control in a case where the deceleration fuel supply cutoff condition is established; and
    a valve lift and operating angle reducing section that reduces at least one of the operating angle of an intake valve and the valve lift thereof via the variably operated valve mechanism to a predetermined extreme minimal value before the fuel supply cutoff control by the fuel supply cutoff section is started in a state in which the deceleration fuel supply cutoff condition is established.

2. An intake air control apparatus for an internal combustion engine as claimed in claim 1, wherein a predetermined delay interval of time is provided from a time at which at least one of the operating angle of the intake valve and valve lift thereof is reduced to the extreme minimal value by the valve lift and operating angle reducing section to a time at which the fuel cutoff section starts the cutoff control of the fuel supply by the fuel supply cutoff section.

3. An intake air control apparatus for an internal combustion engine as claimed in claim 1, wherein the intake air control apparatus further comprises a valve lift and operating angle increasing section that increases at least one of the operating angle of the intake valve and valve lift thereof from the extreme minimal value after the fuel supply cutoff control carried out by the fuel supply cutoff section.

4. An intake air control apparatus for an internal combustion engine as claimed in claim 3, wherein a predetermined delay interval of time is provided between a time at which the cutoff control of the fuel supply by the fuel supply cutoff section is started and a time at which an increase in at least one of the operating angle of the intake valve and the valve lift is started by the lift and operating angle increasing section.

5. An intake air control apparatus for an internal combustion engine as claimed in claim 3, wherein the lift and operating angle increasing section increases at least one of the operating angle of the intake valve and valve lift thereof toward an idling reference value corresponding to the operating angle of the intake valve and valve lift thereof in an engine idling region.

6. An intake air control apparatus for an internal combustion engine as claimed in claim 1, wherein the engine comprises:
    a collector to connect intake passages of a plurality of cylinders;
    a throttle valve positioned upstream to the collector wherein an opening angle of the throttle valve is adjusted by a control signal; and
    a negative pressure equipment that is operated utilizing a negative pressure within the collector,
    wherein the extreme minimal value is a value lower than the operating angle of the intake valve or the valve lift thereof required to secure a predetermined negative pressure within the collector under a state in which the deceleration fuel supply cutoff condition is established.

7. An intake air control apparatus for an internal combustion engine as claimed in claim 1, wherein the fuel supply cutoff control by the fuel supply cutoff section is carried out immediately after the operating angle of the intake valve has reached to the predetermined extreme minimal value.

8. An intake air control apparatus for an internal combustion engine as claimed in claim 1, wherein the deceleration fuel supply cutoff condition comprises an engine demand load determining section that determines whether the engine demand load is minus.

9. An intake air control apparatus for an internal combustion engine as claimed in claim 8, wherein the engine demand load determining section comprises a throttle valve opening angle determining section that determines whether a throttle valve of the engine is completely closed.

10. An intake air control apparatus for an internal combustion engine as claimed in claim 3, wherein the valve lift and operating angle increasing section increases the operating angle of the intake valve toward an idle reference value.

11. An intake air control apparatus for an internal combustion engine as claimed in claim 10, wherein the intake air control apparatus further comprises a fuel supply cutoff execution determining section that determines whether the fuel supply cutoff is being executed after the deceleration fuel supply cutoff condition is established and wherein the fuel supply cutoff is not started until the operating angle has reached the predetermined extreme minimal value when the fuel supply cutoff execution determining section determines that the fuel supply cutoff is not being executed.

12. An intake air control apparatus for an internal combustion engine as claimed in claim 10, wherein the idle reference value corresponds to one of the operating angle of the intake valve and valve lift thereof which is needed to secure a negative pressure for a negative pressure equipment.

13. An intake air control apparatus for an internal combustion engine as claimed in claim 2, wherein the predetermined delay interval is set at a sufficiently shorter period of time than a negative pressure development interval within a collector of the engine.

14. An intake air control apparatus for an internal combustion engine as claimed in claim 4, wherein the predetermined delay interval is set at a sufficiently shorter period of time than a negative pressure development interval within a collector of the engine.

15. An intake air control apparatus for an internal combustion engine as claimed in claim 14, wherein the predetermined interval is a short interval of time that is sufficient for a negative pressure within the collector to be developed.

16. An intake air control apparatus for an internal combustion engine as claimed in claim 1, wherein the predetermined extreme minimal value includes a minimum idling reference value required to secure a combustion stability and a negative pressure of a collector of the engine.

17. An intake air control apparatus for an internal combustion engine, comprising:

variably operated valve means for making at least one of an operating angle of an intake valve and a valve lift thereof variable;

deceleration fuel supply cutoff condition determining means for determining whether a deceleration fuel supply cutoff condition to cutoff the fuel supply to the engine is established;

fuel supply cutoff means for carrying out a fuel supply cutoff control when the deceleration fuel supply cutoff condition is established; and lift and operating angle reducing means for reducing at least one of the operating angle of an intake valve and the valve lift thereof by the variably operated means to a predetermined extreme minimal value before the fuel supply cutoff control by the fuel supply cutoff means is started in a state in which the deceleration fuel supply cutoff condition is established.

18. An intake air control method for an internal combustion engine, the engine comprising a variably operated valve mechanism for making at least one of an operating angle of an intake valve and a valve lift thereof variable, the intake air control method comprising:

determining whether a deceleration fuel supply cutoff condition to cutoff the fuel supply to the engine is established;

carrying out a fuel supply cutoff control when the deceleration fuel supply cutoff condition is established; and reducing at least one of the operating angle of an intake valve and the valve lift thereof by means of the variably operated valve mechanism to a predetermined extreme minimal value before the fuel supply cutoff control is started in a state in which the deceleration fuel supply cutoff condition is established.

* * * * *